United States Patent
Hofsäss

[11] Patent Number: 6,115,916
[45] Date of Patent: Sep. 12, 2000

[54] METHOD OF MANUFACTURING A SHRINK-ON CAP

[76] Inventor: Marcel Hofsäss, Höfener Str. 29, 75305 Neuenbürg/Waldrennach, Germany

[21] Appl. No.: 09/021,359

[22] Filed: Feb. 10, 1998

[30] Foreign Application Priority Data

Nov. 2, 1997 [DD] German Dem. Rep. .......... 197 05 153

[51] Int. Cl.⁷ .................................................. H02R 43/00
[52] U.S. Cl. ................................. 29/883; 29/874; 29/884; 29/622
[58] Field of Search .............................. 29/879, 882, 883, 29/884, 622

[56] References Cited

U.S. PATENT DOCUMENTS

| 2,997,411 | 8/1961 | Woolley . |
| 4,515,648 | 5/1985 | Kolbe et al. . |
| 4,578,296 | 3/1986 | Miyazaki et al. . |
| 4,896,904 | 1/1990 | Gadsden et al. . |
| 5,124,513 | 6/1992 | Blair . |

FOREIGN PATENT DOCUMENTS

| 2478389 | 9/1981 | France . |
| 9010609 U | 10/1990 | Germany . |
| 58076214 | 5/1983 | Japan . |
| 60248335 | 12/1985 | Japan . |
| 61025824 | 2/1986 | Japan . |
| 1-199128 | 8/1989 | Japan . |
| 3-60108 | 3/1991 | Japan . |
| 3-285231 | 12/1991 | Japan . |
| 1151788 | 5/1969 | United Kingdom . |
| 1412762 | 11/1975 | United Kingdom . |

*Primary Examiner*—Carl J. Arbes
*Attorney, Agent, or Firm*—Harness, Dickey & Pierce, P.L.C.

[57] ABSTRACT

A Method of Manufacturing a Shrink-On Cap In a method for manufacturing a shrink-on cap (10'), first of all heat-shrink tubing sections (27) having an opening at each of their two ends (14, 17) are prepared. The heat-shrink tubing section (27) is then pressed together at its end (17), producing a welded seam which constitutes a rim (16) and closes off the corresponding opening. The rim (16) lies substantially in a plane of symmetry of the heat-shrink tubing section (27). The rim (16) is then deformed in such a way that its sharp edge (18) and pointed corners are removed from the plane of symmetry. A method for protecting an electrical component by means of a shrink-on cap (10') produced this way is also described.

16 Claims, 2 Drawing Sheets

METHOD OF MANUFACTURING A SHRINK-ON CAP

BACKGROUND OF THE INVENTION

1. Field of the Invention

The present invention concerns a method for manufacturing a shrink-on cap, comprising the following steps:

a) prepare a heat-shrink tubing section having an opening at each of its two ends; and b) press the heat-shrink tubing section together at its one end and produce a welded or pressed seam, constituting a rim, in order to close off the corresponding opening, the rim lying substantially in a plane of symmetry of the heat-shrink tubing section.

The invention further concerns a shrink-on cap manufactured according to the method, an electrical component protected by the shrink-on cap, and a method for protecting said component.

2. Related Prior Art

Shrink-on caps of this kind are kept on hand as bulk goods and are slid onto electrical components to be protected, for example temperature-dependent switches, and then shrunk on with the use of hot air so as to create a casing which protects the component from dirt, moisture, and electrical contact with other components. The connecting elements of the component, which are often configured as connecting leads, then still project out from said casing.

Shrink-on caps of this kind are manufactured by first cutting heat-shrink tubing sections to length, which are then preshaped and heated at their one end sufficiently that as a result of the application of two welding punches, which occurs at that end from two opposite sides, a rim closed off by a welded or pressed seam is formed. Said rim can have twice the wall thickness of the usual heat-shrink tubing, so that it is very stiff and rigid. It has a sharp edge and two pointed corners. The sharp edge and the pointed corners are retained when prefabricated shrink-on caps of this kind are shrunk onto components being protected.

In the assembly of components with the shrink-on caps and in the further processing of components encased in this fashion, many process steps are done by hand; the persons performing these process steps must perform extremely delicate operations, so that they cannot wear protective gloves.

Because of the sharp edges and pointed corners present on the shrink-on caps, injuries often occur to these persons when handling the shrink-on caps, which of course constitutes a major disadvantage.

In order to avoid these injuries, the persons therefore grasp the encased components not by the shrink-on cap but by the connecting leads, although the result of this during the further handling operations that are necessary is that the connection between the lead and the encased component is weakened or in deed completely destroyed, so that the device produced from such components often functions improperly.

In particular when the components are temperature-dependent switches which are intended to protect, for example, a coil from overheating, the switches encased in this fashion are brought directly into contact with the coil of, for example, electric motors. The switches are electrically connected in series with the coil and interrupt the electrical circuit if the temperature of the coil exceeds a predefined value. For this purpose, a bimetallic switching mechanism is arranged, in known fashion, in the interior of the switch.

To ensure that this protective function can be performed reliably, the switches must be arranged in the interior of the coil or at least must be brought very close to the coil. It has now been found, however, that these actions often result in the coil wire being damaged by the sharp edge and/or the pointed corners, which can result in malfunctions of the device constructed therewith.

The damage caused directly or indirectly by the pointed corners and sharp edges, not only to the component leads but also to other components, is particularly disadvantageous because such damage is often not at all apparent during final inspection, but instead does not become perceptible until the device in question is used.

SUMMARY OF THE INVENTION

In view of the above, it is the object of the present invention to make available a shrink-on cap and a method for its manufacture in which the danger of damage or injury is reduced in a simple manner.

In the case of the method mentioned at the outset, this object is achieved, according to the invention, by the further step:

c) deform the rim so that its sharp edge and pointed corners are removed from the plane of symmetry.

Furthermore, according to the invention a shrink-on cap to be slid and shrunk onto an electrical component, preferably a temperature-dependent switch, in order to protect the component, which has an open first end for sliding onto the component and a second end closed off by a welded or pressed seam constituting a rim, is characterized in that the rim is displaced so that its edge and its corners lie substantially outside a plane of symmetry of the heat-shrink tubing section.

The method according to the invention for protecting an electrical component, preferably a temperature-dependent switch, therefore has the following steps:

a) produce the new shrink-on cap;

b) slide the shrink-on cap, with its open end, onto the component so that its external terminals project out of the shrink-on cap; and c) shrink the shrink-on cap onto the component by using hot air.

In addition, a component according to the invention, preferably a temperature-dependent switch, is equipped with a shrink-on cap produced in accordance with the invention.

The object underlying the invention is completely achieved in this manner.

Specifically, the inventor of the present application has recognized that the disadvantages described above can be eliminated simply by removing the edges and corners of the heatshrink tubes out of the plane of symmetry. Because these edges and corners lie, in the existing art, in the plane of symmetry, they face in the direction in which the components encased in this fashion are slid, for example, into a coil. As a result, however, the rim and the edges automatically come into contact with parts of the coil as the component is being slid in, thus resulting in the damage mentioned above. The same problem exists when the shrink-on caps are slid onto components being protected; in this case the known shrink-on caps exhibit the edge and the sharp corners in the direction opposite to the component, so that the persons engaged in assembling the components slide the shrink-on caps on by pushing on the corners and the sharp edge, as a result of which the injuries already discussed occur.

The sharp edge and pointed corners can be removed from the plane of symmetry by rolling up or by rounding or shortening the rim, i.e., for example, by means of a cutting finishing operation.

It is particularly preferred, however, if, in step c), the rim is bent out of the plane of symmetry.

This feature is in itself surprising, since the edge and the rim are neither rounded nor removed, but merely bent out of the plane of symmetry. The inventor of the present invention has recognized that even a slight deflection out of the plane of symmetry is sufficient greatly to reduce the risk of injury to persons and to equipment.

It is preferred in this context if in step c), the heat-shrink tubing section is heated at least in the region of the rim in order to deform the rim.

It is advantageous here that heating of the rim makes it much easier to bend and deform, without causing further sharp-edged regions to be created by the deformation.

It is further preferred if, in step c), a shaping punch is pressed against the rim in order to deform it.

This feature is advantageous in terms of easy manufacture, since depending on the configuration of welded or pressed seam, the shrink-on cap is merely heated again in the region of the rim, after or during which a shaping punch presses, for example, from the front and in the plane of symmetry onto the rim, and bends the latter upward or downward. As soon as the rim cools off again, it hardens in the shape defined by the shaping punch.

It is preferred in this context if the heat-shrink tubing section is heated locally by hot air, or the shaping punch is heated.

While the advantage of using hot air lies in the fact that this is a very economical process step, since preheating and shaping of the welded or pressed seam is generally also aided by hot air so that the latter is available in any case, the advantage of the heated shaping punch lies in the fact that the rim is specifically heated where it is deformed, i.e. that the region to be deformed can be accurately defined.

It is preferred in general terms if, in step c), the rim is bent by the shaping punch at least approximately 90 degrees out of the plane of symmetry.

The advantage here is that there is now a very small spacing between the edge of the rim and the front end of the shrink-on cap, this small spacing preventing injuries from being caused by the, so to speak, shielded sharp edge.

It is further preferred if, in step c), the rim is bend by the shaping punch more than 90 degrees out of the plane of symmetry. The advantage here is that damage to even the smallest leads and wires is even further prevented, since the rim has now, so to speak, been rolled up on itself, the edge and the corners no longer being accessible from outside.

A further advantage of bending the rim out of the plane of symmetry consists in the fact that the length of the shrink-on cap is shortened by approx. 1 mm, so that a component surrounded by it can be slid more easily into the device being protected. Another advantage of the features described so far lies in the fact that because the rims and edges are now no longer in the way , the shrink-on cap cannot get caught so easily when being slid in. This means, however, that less force must be exerted in order to slide the component into the cavity provided for it, so that the stresses on the connecting leads decrease, which in turn reduces the risk of damage.

Further advantages are evident from the description and the attached drawings.

It is understood that the features mentioned above and those yet to be explained below can be used not only in the respective combinations indicated, but also in other combinations or in isolation, without leaving the context of the present invention.

BRIEF DESCRIPTION OF THE DRAWINGS

The invention is depicted in the drawings and will be explained further in the description below. In the drawings.

DETAILED DESCRIPTION OF A PREFERRED EMBODIMENT

Figure 1:
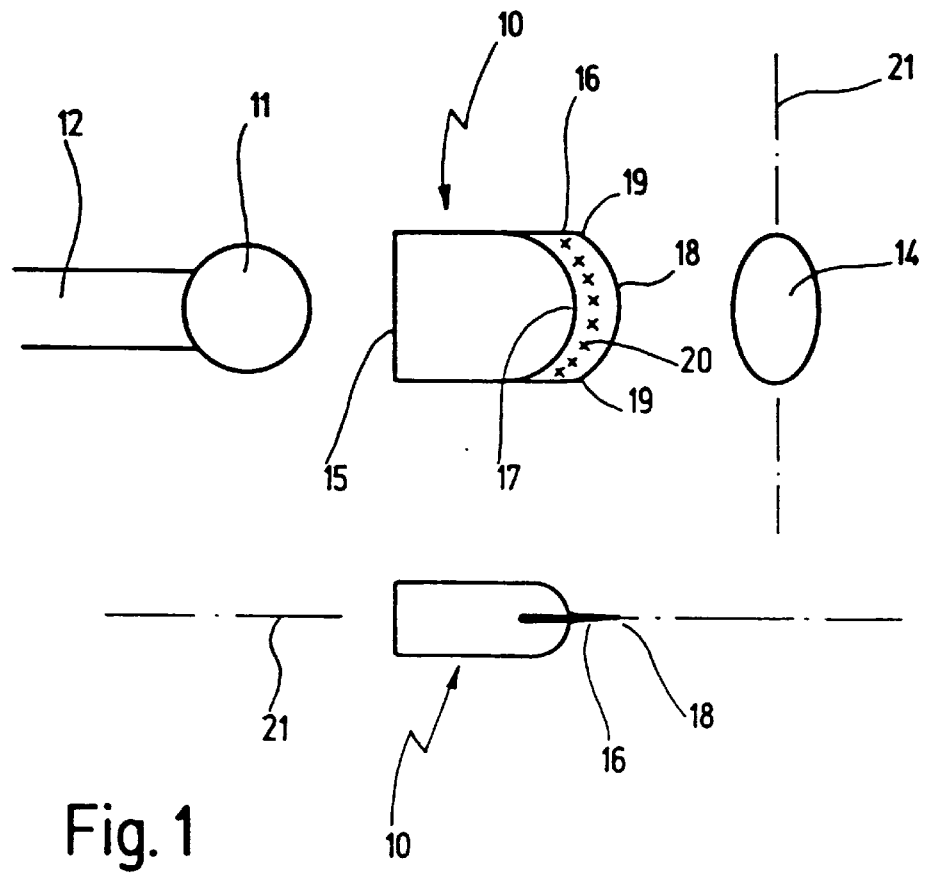
FIG. 1 shows a schematic depiction of a shrink-on cap from the prior art, in several views.

In FIG. 1, 10 designates a shrink-on cap as known from the prior art. The purpose of shrink-on cap 10 is to be slid onto a component 11 whose external terminals 12 are in this case connecting leads. Shrink-on cap 10, whose profile is shown in section at 14, is slid with its open end 15 onto component 11 and then shrunk on by the use of hot air, so that only external terminals 12 project from the casing formed in this fashion.

Shrink-on cap 10 has, in this context, an end 17 closed off by a rigid rim 16. Rim 16 exhibits a sharp edge 18 facing forward, and two external pointed corners 19. Also indicated at 20 is a welded seam which resulted from the formation of rim 16.

In the lower portion of FIG. 1, shrink-on cap 10 is depicted in side view, so that rim 16 with its sharp edge 18, projecting forward beyond shrink-on cap 10, is readily visible. It should also be noted that rim 18 lies substantially in a plane of symmetry, indicated by 21, of shrink-on cap 10.

Sharp edge 18 and pointed corners 19 create a risk of injury to persons, and a risk of damage to other components. According to the invention, this is prevented by the fact that rim 16b is bent, in the direction of an arrow indicated by 22 in FIG. 1, out of plane of symmetry 21. The result of this action may be seen in FIG. 2.

The new shrink-on cap 10' shown there has a much shorter rim 16 than is the case with shrink-on cap 10 of FIG. 1. Edge 18 of rim 16 is bent upward and slightly inward, so that there is no further risk of injury. The spacing 24 present between edge 18 and a bulge 23 of the right-hand, closed end 17 is now so small that persons can no longer be injured on edge 18. This inward bending of rim 16 is accomplished in such a way that pointed corners 19 are also no longer directly accessible.

Figure 3:
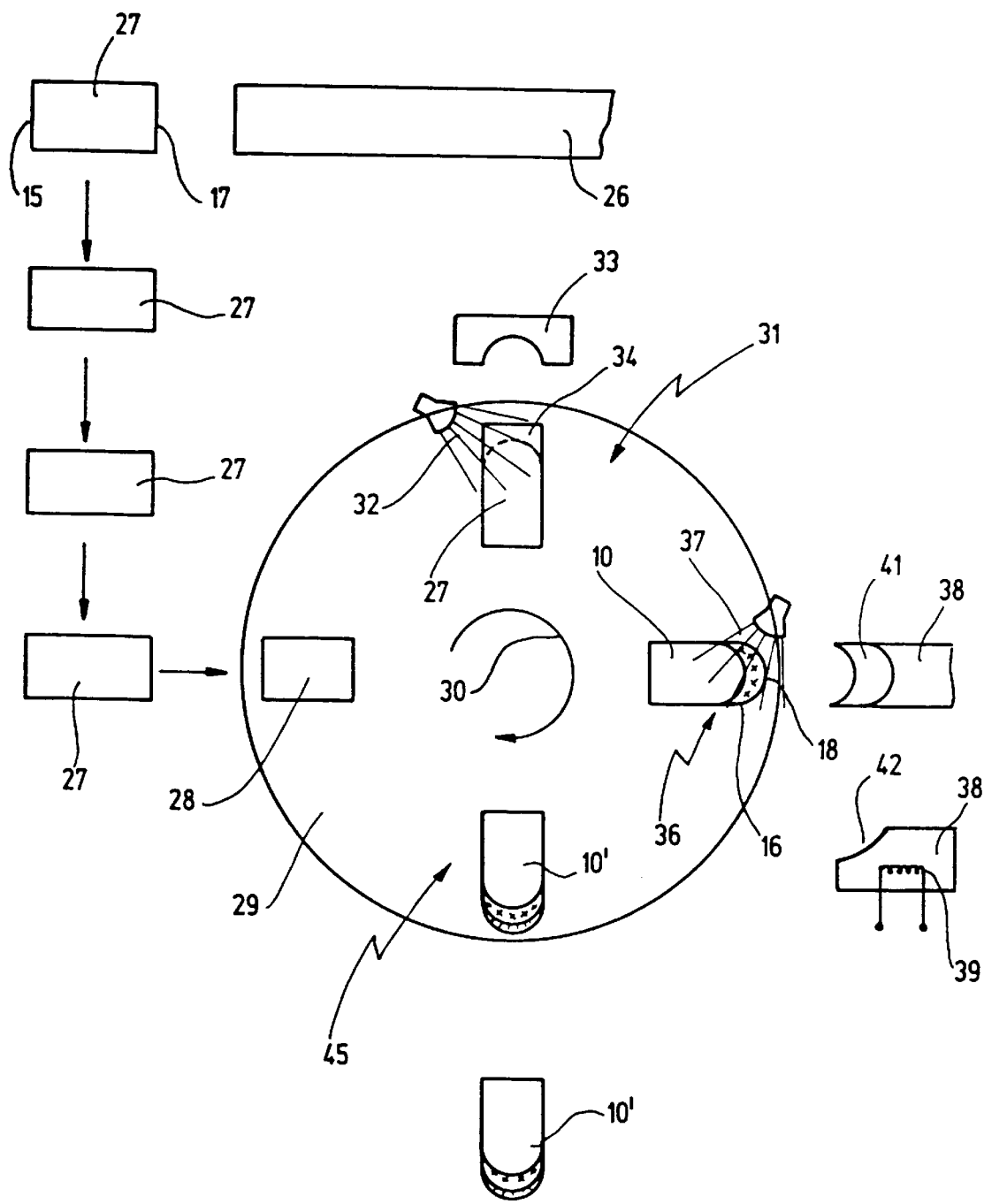
FIG. 3 schematically indicates the process steps for producing the shrink-on cap of FIG. 2 from a continuous heat-shrink tube.

FIG. 3 schematically depicts a method with which the new shrink-on caps 10' can be manufactured from heat-shrink tubing 26.

First, short heat-shrink tubing sections 27, with opposite and still open ends 15, 17, are cut off from heat-shrink tubing 26.

These heat-shrink tubing sections 27 are then slid in succession onto a profiled part 28 which rests on a turntable. 29. After they are slid on, the turntable is rotated 90 degrees in the direction of an arrow 30 so that the respective heat-shrink tubing section 27 arrives in a welding position. There heatshrink tubing section 27 is heated and preshaped by hot air (indicated as 32), while simultaneously two welding punches act on end 17. One of said welding punches is shown in profile at 33. Also shown at 34 is the location where welding punch 33 engages on heat-shrink tubing section 27. Welding punches 33 generally arrive from above and below, and thereby press the heatshrink tubing end together; the heating forms a welded or pressed seam, and creates rim 16.

The method described corresponds to the prior art to the extent that shrink-on cap 10 that is manufactured has the shape shown in FIG. 1. Turntable 29 is then rotated a further 90 degrees in the direction of arrow 30, so that shrink-on cap 10 arrives in a shaping position 36. Here hot air 37 is used in the region of rim 16 to make rim 16 deformable. At the same time, approximately in the plane of symmetry, a shaping punch 38 is pressed from the front against rim 16 in order to bend it out of the plane of symmetry, thus creating the new shrink-on cap 10' shown in FIG. 2.

Welding punch 38 is shown in on the right FIG. 3 both in plan view and in side view; the side view also comprises a heating system 39 which can be used instead of hot air 37 to heat rim 16 accurately before or during deformation.

Figure 2:
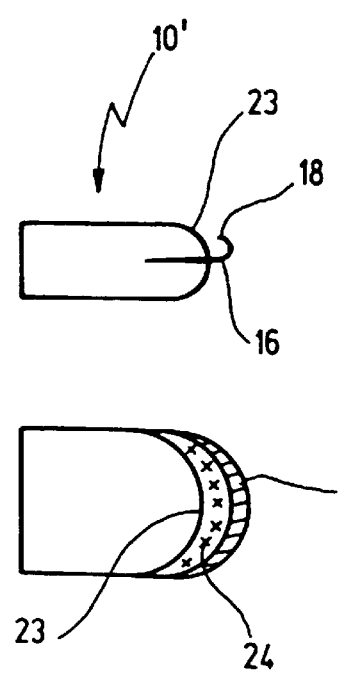
FIG. 2 shows a shrink-on cap according to the invention, in a side view and in a plan view.

Shaping punch 38 has a shaping region 41 with a sloping, curved flank 42, and is moreover, in plan view, adapted to the rounding of edge 18 in such a way that the displacement of shaping punch 38 toward rim 16 causes it to be bent at its corners 19 and its edge 18 upward out of the plane of symmetry, resulting in the new shrink-on cap 10' shown in FIG. 2. It is of course not necessary in this context for edge 18 to be, so to speak, rolled inward; it is instead sufficient if the latter is bent upward approximately 90 degrees out of plane of symmetry 21.

Turntable 29 then once again rotates 90 degrees in the direction of arrow 30 so that shrink-on cap 10' arrives in its ejection position 45.

Therefore, what I claim is:

1. A method for manufacturing a shrink-on cap, comprising
   a) preparing a heat-shrink tubing section having an opening at each of its two ends;
   b) pressing the heat-shrink tubing section together at its one end and producing a welded or pressed seam, constituting a rim, in order to close off the corresponding opening, the rim lying substantially in a plane of symmetry of the heat-shrink tubing section; and
   c) deforming the rim so that its sharp edge and pointed corners are removed from the plane of symmetry.

2. A method as in claim 1, wherein in step c), the rim is bent out of the plane of symmetry.

3. A method as in claim 2, wherein in step c), the heatshrink tubing section is heated at least in the region of the rim in order to deform the rim.

4. A method as in claim 1, wherein in step c), a shaping punch is pressed against the rim in order to deform it.

5. A method as in claim 1, wherein the heat-shrink tubing section is heated locally by hot air.

6. A method as in claim 4, wherein the shaping punch is heated.

7. A method as in claim 4, wherein in step c), the rim is bent by the shaping punch at least approximately 90 degrees out of the plane of symmetry.

8. A method as in claim 7, wherein the rim is bent more than 90 degrees.

9. A method for protecting an electrical component, such as a temperature-dependent switch, having external terminals, comprising the following steps:
   a) producing a shrink-on cap from a heat-shrink tubing section having an opening at each of its two ends, by
      (i) pressing the heat-shrink tubing section together at its one end and producing a welded or pressed seam, constituting a rim, in order to close off the corresponding opening, the rim lying substantially in a plane of symmetry of the heat-shrink tubing section; and
      (ii) deforming the rim so that its sharp edge and pointed corners are removed from the plane of symmetry;
   b) sliding the shrink-on cap, with its open end, onto the component so that its external terminals project out of the shrink-on cap; and
   c) shrinking the shrink-on cap onto the component by using hot air.

10. A method as in claim 9, wherein in step a) (ii), the rim is bent out of the plane of symmetry.

11. A method as in claim 10, wherein in step a) (ii), the heat-shrink tubing section is heated at least in the region of the rim in order to deform the rim.

12. A method as in claim 9, wherein in step a) (ii), a shaping punch is pressed against the rim in order to deform it.

13. A method as in claim 9, wherein the heat-shrink tubing section is heated locally by hot air.

14. A method as in claim 12, wherein the shaping punch is heated.

15. A method as in claim 12, wherein in step a) (ii), the rim is bent by the shaping punch at least approximately 90 degrees out of the plane of symmetry.

16. A method as in claim 15, wherein the rim is bent more than 90 degrees.

* * * * *